(12) United States Patent
Chen et al.

(10) Patent No.: US 8,428,244 B2
(45) Date of Patent: Apr. 23, 2013

(54) CROSS-CALL AGENT EXTENSION MOBILITY WITH CALL ADMISSION CONTROL AND EMERGENCY CALLING

(75) Inventors: Edward Chungming Chen, Plano, TX (US); Christopher Edwin Pearce, Dallas, TX (US); Chunfeng Huang, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1073 days.

(21) Appl. No.: 12/404,868

(22) Filed: Mar. 16, 2009

(65) Prior Publication Data
US 2010/0150337 A1 Jun. 17, 2010

Related U.S. Application Data

(63) Continuation-in-part of application No. 12/333,818, filed on Dec. 12, 2008.

(51) Int. Cl.
*H04M 3/00* (2006.01)

(52) U.S. Cl.
USPC ............ 379/265.02; 379/265.01; 379/265.11

(58) Field of Classification Search ............ 379/265.01–265.14, 266.01–266.1, 379/309, 114.07, 211.01–211.02, 212.02, 379/201.01
See application file for complete search history.

(56) References Cited

U.S. PATENT DOCUMENTS

| | | | |
|---|---|---|---|
| 4,899,373 A * | 2/1990 | Lee et al. ................. | 379/201.05 |
| 5,363,425 A * | 11/1994 | Mufti et al. .............. | 379/201.06 |
| 5,574,780 A * | 11/1996 | Andruska et al. ........ | 379/221.09 |
| 6,219,702 B1 * | 4/2001 | Ikehara et al. ................ | 709/224 |
| 6,317,484 B1 * | 11/2001 | McAllister ................ | 379/88.02 |
| 6,449,284 B1 * | 9/2002 | Hagirahim .................... | 370/466 |
| 6,950,508 B1 * | 9/2005 | Griffiths .................... | 379/201.01 |
| 7,139,811 B2 * | 11/2006 | Lev Ran et al. ............... | 709/217 |
| 7,245,709 B2 * | 7/2007 | Dobner et al. ........... | 379/114.21 |
| 7,839,879 B2 * | 11/2010 | Trasi et al. .................... | 370/420 |
| 7,864,766 B2 * | 1/2011 | Morrison et al. ............. | 370/389 |
| 8,060,071 B2 * | 11/2011 | Bertagnole et al. ........... | 455/417 |
| 8,265,676 B2 * | 9/2012 | Omar ........................... | 455/509 |
| 2002/0025821 A1 * | 2/2002 | Clapton et al. ................ | 455/456 |
| 2004/0264665 A1 * | 12/2004 | Idoni et al. ............... | 379/201.01 |
| 2005/0235158 A1 | 10/2005 | Shaffer et al. | |
| 2005/0278646 A1 * | 12/2005 | Liscano et al. ................ | 715/762 |
| 2006/0182255 A1 * | 8/2006 | Luck et al. ............... | 379/220.01 |
| 2008/0186963 A1 * | 8/2008 | Trasi et al. .................... | 370/389 |
| 2009/0060150 A1 * | 3/2009 | Amport et al. ............. | 379/88.17 |
| 2009/0319663 A1 * | 12/2009 | Giles et al. .................... | 709/226 |
| 2010/0091765 A1 * | 4/2010 | Doshi et al. ................... | 370/352 |
| 2010/0150149 A1 * | 6/2010 | Morrison et al. ............. | 370/389 |

OTHER PUBLICATIONS

Office Action issued Feb. 29, 2012, in corresponding U.S. Appl. No. 12/333,818, 7 pgs.; U.S. Patent and Trademark Office, Alexandria, VA.

* cited by examiner

*Primary Examiner* — William Deane, Jr.
(74) *Attorney, Agent, or Firm* — Brinks Hofer Gilson & Lione

(57) ABSTRACT

A system for cross-registration of a phone device is provided. The system includes a local call processing system that stores phone device information for a local phone that is operable to be used by a user; and a remote call processing system that stores a user phone profile for the user, the remote call processing system being operable to generate a visitor registration for the local phone device. The phone device is operable to use the visitor registration to register with the remote call processing system.

19 Claims, 8 Drawing Sheets

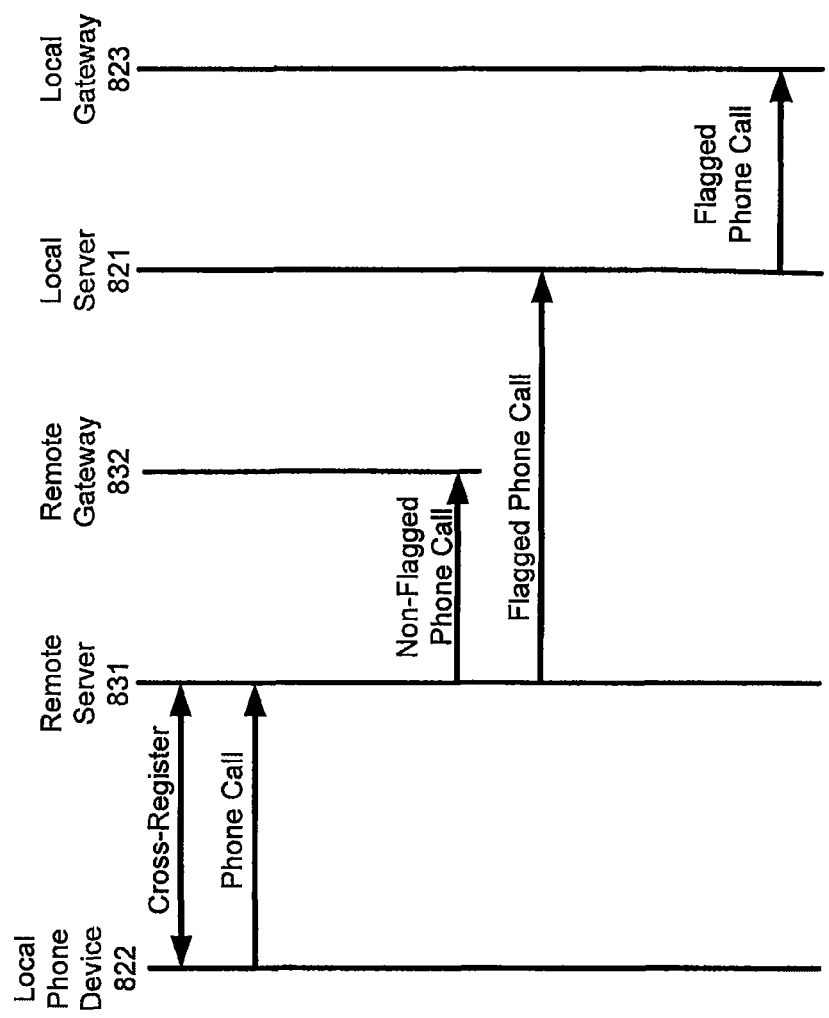
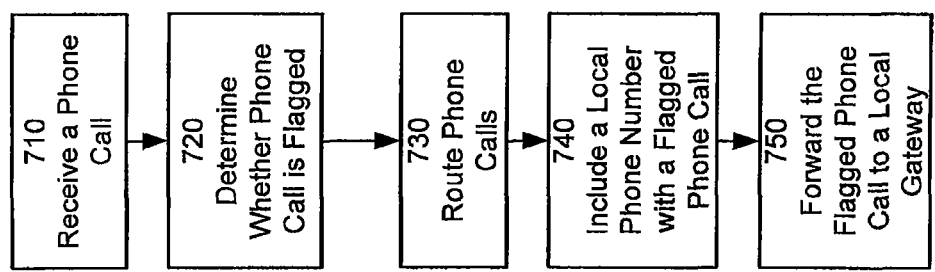
FIGURE 8
FIGURE 7

CROSS-CALL AGENT EXTENSION MOBILITY WITH CALL ADMISSION CONTROL AND EMERGENCY CALLING

CROSS-REFERENCE TO RELATED APPLICATION

The present patent document is a continuation-in-part of U.S. patent application Ser. No. 12/333,818, which was filed on Dec. 12, 2008, the entire contents of which is hereby incorporated by reference.

FIELD OF TECHNOLOGY

The present embodiments relate to cross-registration of a phone device with a remote call processing system.

BACKGROUND

When a user logs into a phone, which is served by his home call processing system, the home call processing system has access to the user's preferences and phone device information, which are stored in the home call processing system. The home call processing system provides the user's preferences to the phone. However, when a user logs into a phone, which is not served by his home call processing system, the call processing system supporting the phone does not have access to the user's preferences. Accordingly, the call processing system can not lay the user's preferences over the phone configuration.

BRIEF DESCRIPTION OF THE DRAWINGS

FIG. 7 illustrates one embodiment of an emergency call routing procedure with cross-registration;

FIG. 8 illustrates one embodiment of emergency call routing with cross-registration;

DETAILED DESCRIPTION

Figure 1:
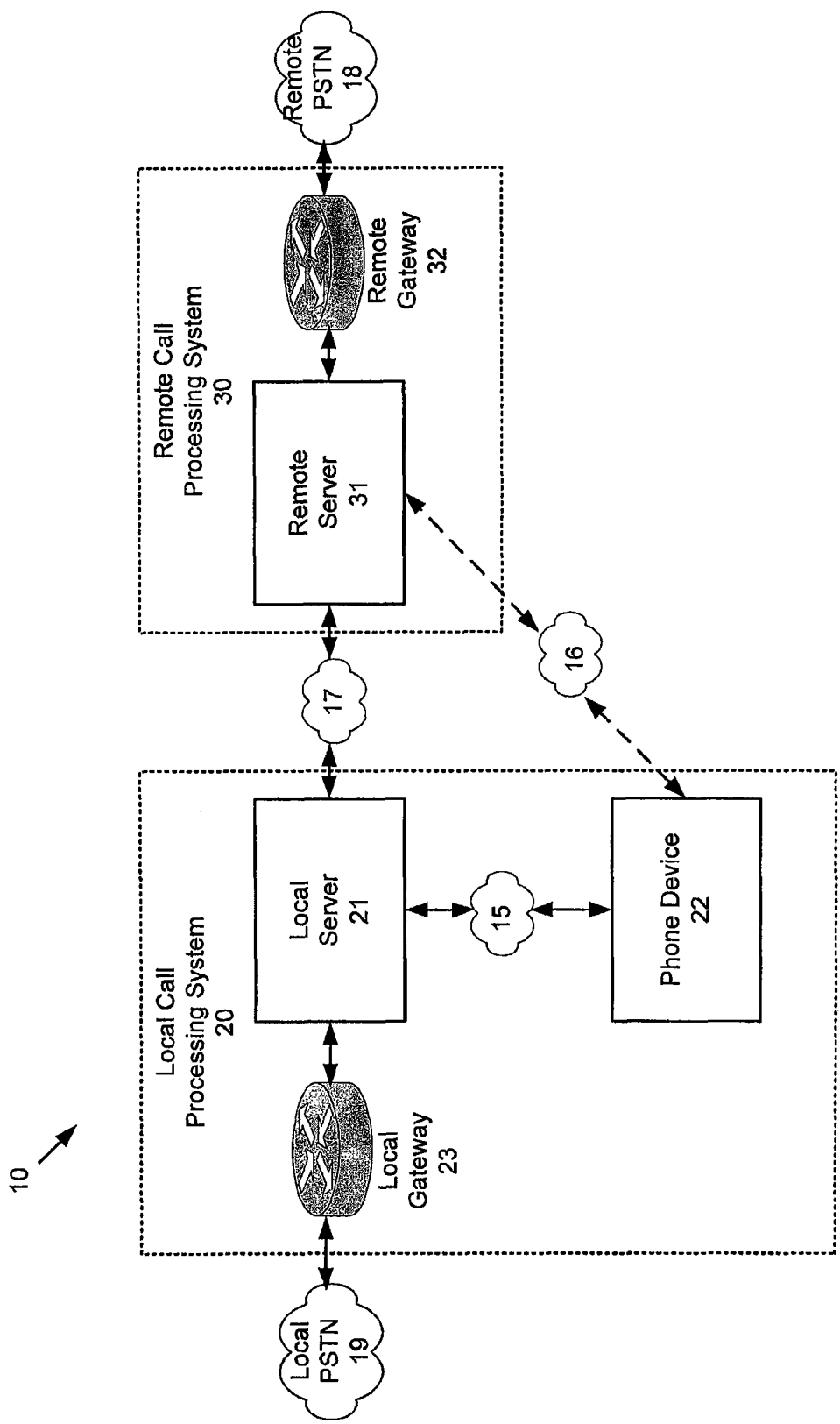
FIG. 1 illustrates one embodiment of a system for cross-registration of a phone device.

The present embodiments relate to cross-registration of a phone device with a remote call processing system. Cross-registration is the process of overlaying phone preferences, which are stored in a first call processing system, onto a phone device configuration, which is stored in a second, different call processing system. As used herein, overlaying phone preferences may include combining phone preferences with the phone device configuration.

In a first embodiment, a system includes a local call processing system and a remote call processing system. Phone device information for a local phone, which is operable to be used by a user, is stored in the local call processing system. The remote call processing system stores a user phone profile for the user. The remote call processing system is operable to generate a visitor registration for the local phone device. The phone device is operable to use the visitor registration to login to the remote call processing system.

In a second embodiment, a device includes computer readable storage media and a processor that is operable to execute instructions stored in the storage media. The storage media includes cross-registration instructions and receiving instructions. The cross-registration instructions are executable to cross-register a phone device located in a first call processing system with a second call processing system. The first call processing system stores the phone device information and the second call processing system stores the user phone profile. The receiving instructions are executable to receive a phone call from the phone device.

In a third embodiment, a method is provided. The method includes receiving phone device information for a phone device located in a first call processing system, which does not include a user phone profile for a user of the phone device; generating a visitor registration for the phone device based on the phone device information; and registering a phone device using the visitor registration.

In one illustration, which will be referred to herein as "the illustration above," John has a home office in New York City (NYC). A NYC Call Processing System supports phones located in the NYC Office. Since John's home office is in NYC, the NYC Call Processing System stores John's phone profile. The NYC Phone may be configured with John's phone preferences, which are stored in John's Phone Profile. For example, John's phone preferences may include speed dial features or dialing habit features. The NYC phone may download configuration instructions from the NYC Call Processing System. When John logs in to the NYC Call Processing System using a NYC Phone, John's phone preferences may be provided to the NYC Phone. When visiting the Chicago Office, John uses a Chicago Phone to place calls. The Chicago Phone System recognizes that John's Phone Profile is not stored in the Chicago Call Processing System and may automatically register the Chicago Phone with the NYC Call Processing System. The Chicago Phone information is overlaid with John's Phone Profile, so that John can use the features stored in the NYC Call Processing System while using the Chicago Phone.

Figure 2:
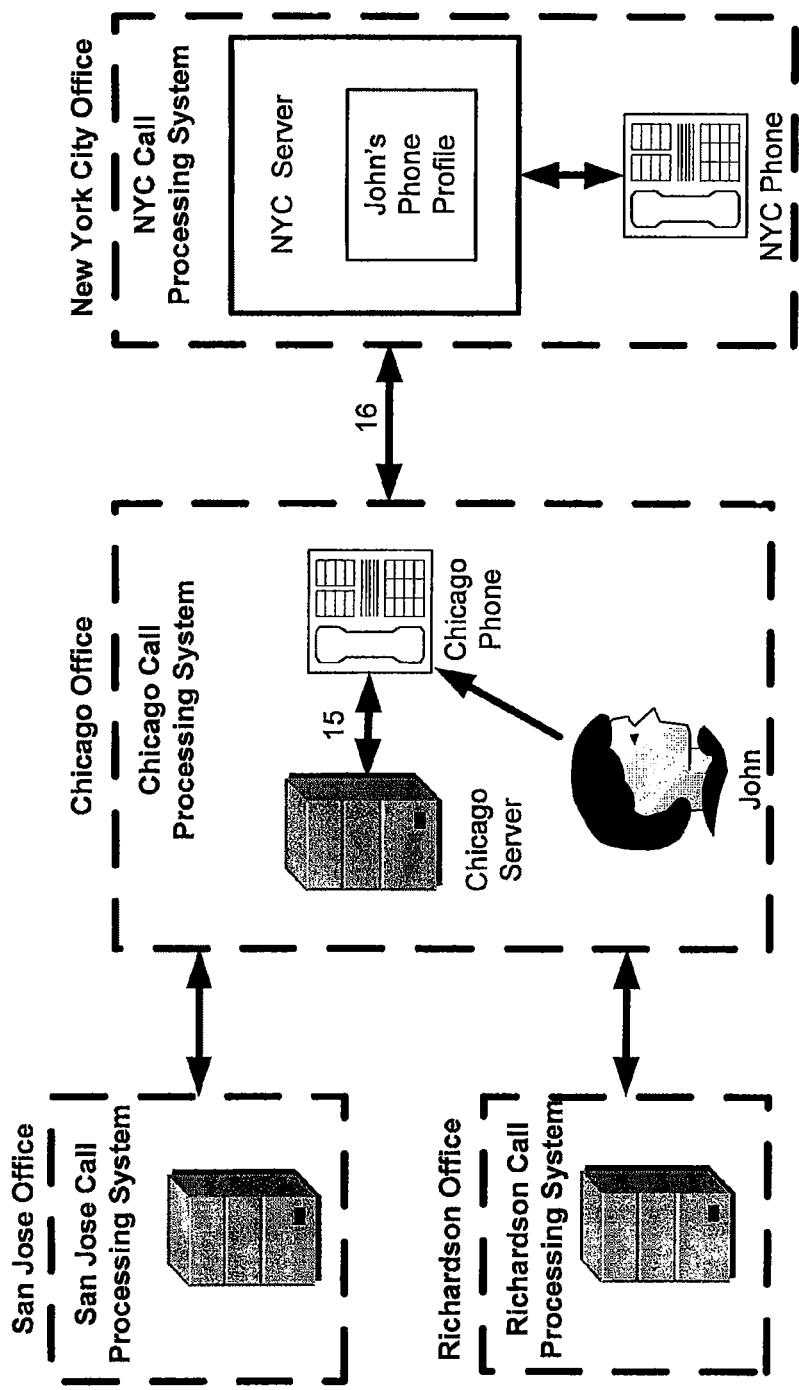
FIG. 2 illustrates another embodiment of a system for cross registration of a local phone device.

FIG. 1 shows a system 10 for cross-registration. The system 10 includes a local call processing system 20 and a remote call processing system 30. Additional, different, or fewer call processing systems may be provided, such as associated with a plurality of regional offices. For example, in the illustration above, which is illustrated in FIG. 2, the Chicago Call Processing System is the local call processing system 20 and the NYC Call Processing System is the remote call processing system 30. In addition to the Chicago Office and the NYC Office, the system 10 may include the San Jose Office and the Richardson Office. Each office may have an independent call processing system that is geographically separated from the other call processing systems.

The system 10 may be operable to overlay user phone preferences, which are stored in the remote call processing system 30, onto a local phone device 22 located in the local call processing system 20. From another perspective, the system 10 is operable to provide user phone preferences stored in a local call processing system 20 to a remote call processing system 30 for overlay on a phone used with the remote call processing system 30. The terms local and remote may vary depending on perspective. For simplicity herein, the term "local" may be used with the phone being operated.

The system 10 provides automated assistance for registering the local phone device 22 with the remote call processing system 30, which stores the user's phone profile. The phone profile provides phone features, preferences, and configurations, which are stored in the remote call processing system 30 to the local phone device 22. Phone features and preferences may include speed dialing features, volume settings, or other features now known or later developed for phones. Phone configurations may include phone numbers normally associated with the phone or other configurations.

The system 10 may be operable to automatically detect and route cross-registered phone calls, such as emergency phone calls. The system 10 may detect a flagged phone call, for example, an emergency phone call, from a cross-registered phone device 22. The system 10 may automatically route the flagged phone call, for example, to a location that is local to the geographically close to the local phone device 22. For example, an emergency phone call may be routed back to the local call processing system 20, such that the emergency phone call may be placed through a local Public Switched Telephone Network (PSTN). The system 10 may automatically substitute a local phone number for an original phone number associated with the remote call processing system, such that the location of the local phone device 22 may be geographically located based on the local phone number.

The system 10 may automatically control call admission based on bandwidth available to the remote call processing system 30. The system 10 may prevent a caller from oversubscribing the network through the placement of voice over Internet Protocol (VoIP) calls. The system 10 monitors the bandwidth available to the local call processing system 20 and remote call processing system 30 and the bandwidth requested for the local phone device 22, such that callers that would oversubscribe the available bandwidth are prevented from placing calls. The remote call processing system 30 may notify the local call processing system 20 and instruct the local call processing system 20 to track the bandwidth for the phone call.

As shown in FIG. 1, the local call processing system 20 includes a local server 21 and a local phone device 22. Additional, different, or fewer components may be provided. For example, as shown in FIG. 1, a local gateway 23 may be provided for routing phone calls across a local network, such as a local PSTN or H.323 network. In another example, multiple local phone devices 22 are provided.

The local call processing system 20 is a visiting call processing system, a visiting phone cluster, a network, a call manager system, a unified communications system, or other system for handling calls. For example, the local call processing system 20 is a call manager system that provides automated assistance for configuring phone devices, which are registered with and/or located within the call manager system. The phone devices may be configured to provide the user with user-specific preferences, such as speed dialing and other phone profile features. In another example, the local call processing system 20 is a visiting call processing system that automatically provides a visiting caller, which is using the local phone device 22, with user preferences. The user preferences may be stored remotely, for example, in the remote call processing system 30.

The local call processing system 20 may be used to register a local phone device 22. Registration of a local phone device 22, which is located in the local call processing system 20, is intra-system registration. Intra-system registration is the registration of a local phone device 22 with a local system that includes both the phone device information and the user's phone profile.

The local call processing system 20 may be used to cross-register a local phone device 22. Cross-registration of a local phone device 22 includes registering the local phone device 22, which is located in the local call processing system 20, with the remote call processing system 30 storing the user's phone profile.

The local call processing system 20 is a system that stores phone device information for the local phone device 22. The remote call processing system 30 is a system that stores user preference information for the user of the local phone device 22. The local call processing system 20 is the system where the local phone device 22, which is being used by a user (e.g., John), is geographically present. The local call processing system 20 is the system that includes the resources needed to support the local phone device 22 being used. The resources may include, for example, gateways and RSVP agents. In another example, the local call processing system 20 is a system that does not store a user phone profile for a user using the local phone device 22. In the illustration above, as shown in FIG. 2, the Chicago Call Processing System, which supports the Chicago Office, is the local call processing system 20 because John is using a Chicago Phone. The Chicago Phone information is stored in the Chicago Call Processing System, and John's Phone Profile is stored in the NYC Call Processing System.

The local phone device 22 is an Internet Protocol (IP) telephony device, telecommunications device, mobile device, digital telephony device, landline telephone, wireless telephone, personal computer, personal digital assistant (PDA), smart telephone, cellular device, or other telephone device for placing and/or receiving phone calls. For example, the local phone device 22 is an IP telephony device that is used to transmit and receive sound, such as speech or voice recordings. In the illustration above, the Chicago Phone is the local phone device 22.

The local phone device 22 may communicate using networks 15, 16, 17. The networks 15, 16, 17 may be communication networks, wired networks, wireless networks, Internet Protocol (IP)/Transmission Control Protocol (TCP) networks, Session Initiation Protocol (SIP) networks, other protocol defined network, or any known or later developed network for communicating. For example, the local phone device 22 may use an IP network to communicate with the local server 21.

The local phone device 22 may be used to allow conversing with a user of one or more other telephone devices over a telephone network. The telephone network may be made up of one or more type of networks, such as a Public Switched Telephone Network (PSTN), IP telephony network, a "plain old telephone service" (POTS) network, a combination thereof, or any other now known or later developed network. For example, a phone call may be routed to the local gateway 23 for transmission over a local PSTN. In another example, an IP phone call may be routed across an IP network.

The local phone device 22 is used to login to or attempt to login to a local call processing system 20. Login information may be transmitted to the local server 21. Login information may include registration information, authorization information, credential information, phone device information, or any other type of information needed for login. For example, a user may use the local phone device 22 to input user identification (ID) information, password information, confidential criteria, other input that identifies the user or device, or other information used to authorize a phone user. In the illustration above, as shown in FIG. 2, John uses the Chicago Phone while visiting the Chicago Office. Prior to placing a phone call from the Chicago Phone, John uses the Chicago Phone to attempt to login to the Chicago Call Processing System. Attempting to login may include John inputting his employee ID (e.g., "John123") and password (e.g., "secret123"). The Chicago Phone may transfer the employee ID and password to the Chicago Server.

The local phone device 22 may store the login, such that the user does not have to login each time the local phone device 22 is used to place a call. For example, a user may login to the local call processing system 20. The user may place future calls without login procedures. In another example, local phone device 22 may be associated with the user, such that each time the user uses the local phone device 22 the phone is cross-registered, such that login procedures may be skipped.

Figure 3:
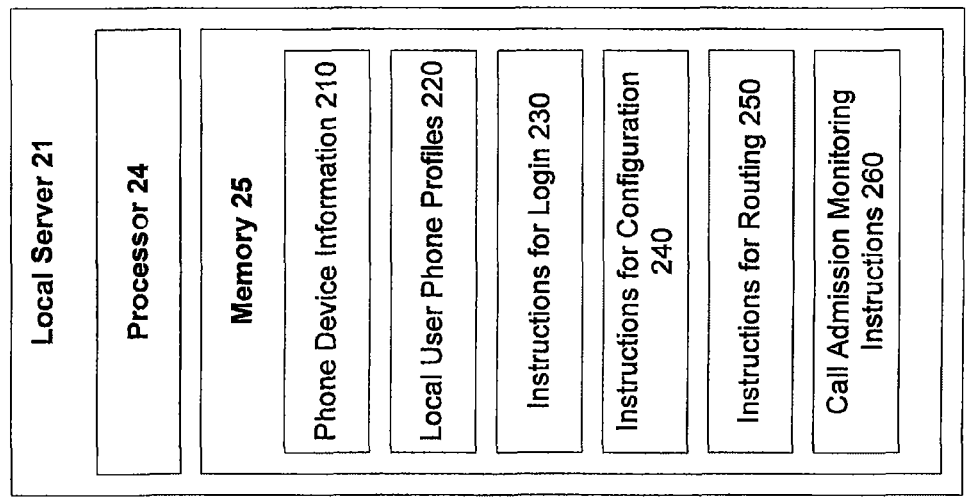
FIG. 3 illustrates one embodiment of a local server.

FIG. 3 illustrates one embodiment of a local server 21. The local server 21 includes a processor 24 and memory 25. Additional, different, or fewer components may be provided. For example, the local server 21 may include the local gateway 23 or perform the functions of the local gateway 23.

The local server 21 is a call processing server, configuration server, login server, extension mobility server, network server, Trivial File Transfer Protocol (TFTP) server, Unified Communications Manager, central server, call manager server, visiting server, or other device for handling call processing. For example, the local server 21 is login server that logs the local phone device 22 into the local call processing system 20. In another example, the local server 21 is a configuration server that configures the local phone device 22 with the user's preferences, when the user's phone profile is stored in the local call processing system 20. In yet another example, the local server 21 is an extension mobility server that communicates local phone device 22 information to a remote server for cross-registration of the local phone device 22.

The processor 24 may receive login information from the local phone device 22. The login information may be used to determine whether the user's phone profile is stored in the local server 21. Determination may include searching local user phone profiles 220, which may be stored in memory 25, as shown in FIG. 3. The local user phone profiles 220 may be sorted or searched based on login information. In the illustration above, as shown in FIG. 2, the Chicago Call Processing System may have a Chicago database of Chicago phone profiles. The Chicago database may include a phone profile for Jack and Jill. Jack's user ID may be "Jack123," and Jill's user ID may be "Jill123." Upon John attempting to login to the Chicago Call Processing System, the Chicago Server searches the Chicago database for "John123." The Chicago Server will determine that John's phone profile is not in the Chicago Call Processing System.

The processor 24 may locate a remote call processing system 30 with the user's phone profile. Locating a user's phone profile may include transmitting an inquiry, searching a remote database, retrieving location information in a local or remote database, or any other now known or later developed process for determining that a remote call processing system 30 has the user's phone profile. For example, location information for the user's phone profile may be stored in a local database. The processor 24 may read the location information, which includes an address. The processor 24 may send an inquiry to the address. In the illustration above, the Chicago Server may transmit an inquiry to one or more of the remote call processing systems, which includes the San Jose Call Processing System, the Richardson Call Processing System, and the NYC Call Processing System. The Chicago Server may send a message, such as a message representing the question "Do you have John's Phone Profile," to the remote call processing systems. The Richardson and San Jose Call Processing Systems may respond negatively; the NYC Call Processing System may respond affirmatively.

The processor 24 transmits local phone device 22 information to the remote server 31. The local phone device 22 information may include device details, such as information relating to the device, protocol, model, cluster, network, system, country, site, user, authorization, or other information relating to the device. The local phone device 22 information may be used to generate a registration slot for the local phone device 22. Alternatively, the local phone device 22 information is not transmitted to the remote server 31.

The processor 24 may receive remote call processing system information. The remote call processing system 30 information may include information relating to location, such as an address or geographic location, system performance, device information, or other information relating to the remote call processing system 30. For example, a registration address may be transmitted to the local server 21. The address may be a TFTP address or other address used for accessing the remote call processing system 30.

The processor 24 may modify the local phone device 22 record stored in the local call processing system 20. Modification may include updating, amending, substituting, or writing. The local phone device 22 record is modified so that when a user (e.g., John) attempts to login to the local call processing system 20 using the local phone device 22, the user is directed to the remote call processing system 30. For example, the registration address may be changed from a local registration address to a remote registration address. Alternatively, the user profile information is provided to and managed by the local call processing system 20.

The processor 24 may receive a flagged phone call from the remote server 31. The processor 24 may replace an original phone number with a local phone number when the received phone call is flagged. Replacing the original phone number may include substituting or modifying the original phone number. The local phone number may be a manufactured number that is associated with a geographical location of the local phone device 22. For example, in the illustration above, John's original phone number (e.g., 212-813-5123), which is associated with a NYC location, may be replaced with a local phone number (e.g., 312-333-6123), which is associated with a Chicago location. As used herein, the original phone number and local phone number may be cross-registered phone numbers, identification numbers, call processing directory numbers, enterprise numbers, or other number indicating the source of a phone call.

The local phone number may be included in an emergency database. The emergency database may be, for example, used by an emergency department to locate the local phone device 22 being used to place the phone call. The emergency database may include the local phone number and a geographical location associated with local phone number. The geographical location may be the physical address (e.g., 123 Maple Street) of the local phone device, such that the emergency department may identify the location of the local phone device 22 based on the local phone number.

The processor 24 may route flagged phone calls to a local gateway 23. The local gateway 23 may be used to transfer IP calls to a local PSTN 19. For example, when a cross-registered local phone device 22 places an emergency call, the emergency phone call may be routed to a local PSTN 19 with a local phone number that may be used to locate the local phone device's 22 geographical location.

One benefit of routing flagged calls through a local PSTN is that an emergency call being placed by a local phone device 22 may be routed to a local emergency department. For example, in the illustration above, after cross-registration of the Chicago Phone, John may dial "911" using the Chicago Phone. Since the Chicago Phone is cross-registered with the NYC call processing system, John's calls are sent to the NYC call processing system. However, John may need assistance from a Chicago emergency department (e.g., using a local PSTN); not a NYC emergency center (e.g., using a remote PSTN). The emergency phone call is routed from the NYC call processing system to the Chicago call processing system. Since the Chicago Phone is cross-registered, John's phone profile is provided to the Chicago Phone. Accordingly, the emergency phone call is associated with John's original phone number (e.g., 212-813-5123). In order to allow the local emergency department to locate the Chicago Phone, the Chicago call processing system replaces the original phone number with a local phone number (e.g., 312-333-6123). The emergency phone call is then routed to the local gateway 23. Since the phone call includes a local telephone number, which indicates the geographical location of the Chicago phone, the Chicago emergency officials may be able to quickly locate the geographical location of the Chicago phone upon receiving the emergency phone call.

The memory 25 may store information, such as phone device information 210 and one or more local user phone profiles 220. The information may be stored in a database. The information may be read, changed, sorted, searched, or displayed. The local phone device information 210 relates to the device being registered or being used to place a phone call. A local user phone profile 220 relates to a phone profile for a system 10 user that is registered in the local call processing system 20. For example, in the illustration above, another phone user, Mary, may be stationed in the Chicago Office. The Chicago Call Processing System may store Mary's phone profile as a local user phone profile 220, since Mary is a system user that is registered in the Chicago Call Processing System. However, the Chicago Call Processing System may not store John's phone profile, since he is not a local user. However, in an alternative embodiment, John's phone profile may be transferred to the Chicago Call Processing System after cross-registration. Accordingly, John's phone profile may be stored there.

The memory 25 may store instructions, such as login instructions 230, instructions for configuration 240, instructions for routing 250, and instructions for call admission monitoring 260. Additional, different, or fewer instructions may be stored in the memory 25.

The instructions for login 230 may be executed to receive and process login information. Processing the login information may include checking a database for information relating to the login information. For example, the instructions for login 230 may be executed to search a database of phone profiles for a user's login identification.

The instructions for login 230 may be executed to login the user to the local call processing system 20. For example, if the user's login information is stored in the local call processing system 20, the user may be logged in to the local call processing system 20. The instructions for login 230 may also be executed to locate a call processing system that stores the user's phone profile. For example, if the user's profile is not stored in the local call processing system 20, the login instructions may be executed to locate a remote call processing system 30 that stores the user's phone profile. Alternatively, or additionally, the instructions for login 230 may be executed to initiate cross-registration. The instructions for login 230 may be executed to provide phone device information to the remote call processing system that stores the user's phone profile.

The instructions for configuration 240 may be executed to configure a phone device record for the phone device being used by the user. For example, the instructions for configuration 240 may be used to update the phone device record in the local call processing system 20 to reflect that a phone device is cross-registered with a remote call processing system 30.

The instructions for routing 250 may be executed to route phone calls and other information. For example, the instructions 250 may be used to route emergency phone calls to a local PSTN. In another example, the instructions 250 may be used to route information, such as bandwidth information, to remote call processing systems.

The call admission control instructions 260 may be executed to provide call admission control, such that a caller is prevented from oversubscribing the network through the placement of too many VoIP calls. The call admission control instructions 260 may be executed to monitor bandwidth of the local call processing system and/or the remote call processing system. The call admission control instructions 260 may be executed to admit or deny phone calls based on the availability of the bandwidth.

As shown in FIG. 1, the remote call processing system 30 includes a remote server 31. Additional, different, or fewer components may be provided. For example, the remote call processing system 30 may include a remote gateway 32 that is operable to transmit information across a remote network, such as a remote PSTN or IP network. In another example, the remote call processing system 30 includes one or more phone devices that are used within the remote call processing system 30. In yet another example, a plurality of remote servers 31 may be provided.

The remote call processing system 30 is a service system, a home call processing system, a phone cluster, a network, a call manager system, a unified communications system, a call routing system, or other system for handling calls. For example, the remote call processing system 30 is a call manager system that is operable to generate a visitor registration for a phone device located in a geographically distinct call processing system, such as the local call processing system 20. The phone device 22 may be configured to provide the user (e.g., John) with user-specific preferences, such as speed dialing and other phone profile features. In another example, the remote call processing system 30 is a home call processing system that automatically provides a caller (e.g., John), who is using a phone device local to a different call processing system, with user preferences. The user preferences may be stored in the home call processing system and the phone device information may be stored in the different call processing system, such as a visiting call processing system. In the illustration above, the NYC Call Processing System is the home call processing system and the Chicago Call Processing System is the visiting call processing system.

Figure 4:
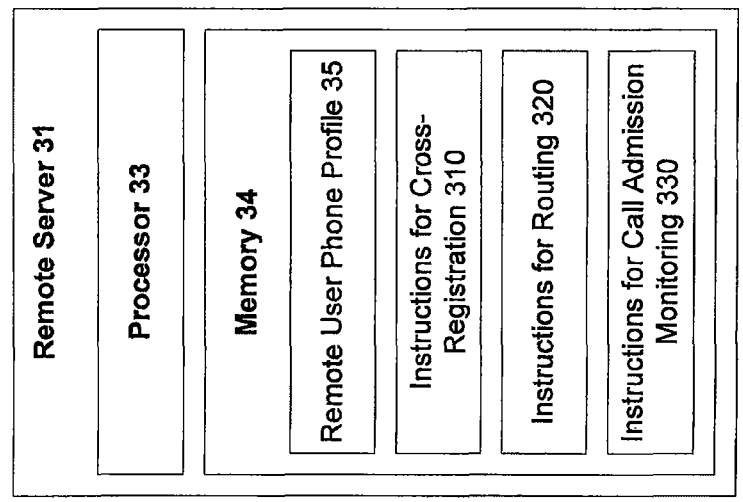
FIG. 4 illustrates one embodiment of a remote server.

As shown in FIG. 4, the remote configuration server 31 includes a processor 33 and a memory 34. Additional, different, or fewer components may be provided.

The remote server 31 is a call processing server, login server, extension mobility server, TFTP server, network server, central server, unified communications manager, call manager server, visiting server, call manager system, network of one or more call processors and memories, or other server for handling call processing. For example, the remote server 31 is a call processing server that is used to store a user's phone profile. The remote server 31 may provide the local phone device 22 with the user's phone profile, which is stored in the remote server 31, such that the local phone device 22 may be provided with the user's phone preferences (e.g., routing, speed, class of service). Accordingly, the user (e.g., John) may use or be supplied the user's phone preferences using the local phone device 22. In another example, the remote server 31 includes the configuration server that provides the user's phone the information needed to function, such as an IP address and/or SRST references.

The processors 24, 33 may be general processors, digital signal processors, application specific integrated circuits, field programmable gate arrays, analog circuits, digital circuits, combinations thereof, or other now known or later developed processors. The processors 24, 33 may be single devices or a combination of devices, such as associated with a network or distributed processing. Any of various processing strategies may be used, such as multi-processing, multi-tasking, parallel processing, or the like. Processing may be local, as opposed to remote. For example, the processor 24 is operable to perform processing completed by the processor 33. The processors 24, 33 are responsive to instructions stored as part of software, hardware, integrated circuits, firmware, micro-code or the like.

The processor 33 receives the local phone device 22 information from the local server 21. The processor 32 may store or process the local phone device 22 information.

The processor 33 is operable to generate a visitor registration for the local phone device 22 based on the local phone device 22 information. The visitor registration may be used for cross-registration. The visitor registration may be a device profile, which may be stored in the remote call processing system 30, used to recognize a local phone device 22. The visitor registration may be used to associate a user (e.g., John) with the local phone device 22 being cross-registered. In the illustration above, the NYC Call Processing System generates a visitor registration for John and the Chicago Phone. Based on the local phone device 22 information, the NYC Server may associate John with the Chicago Phone.

The visitor registration may be temporary or permanent. For example, the visitor registration slot may expire after a defined period of time, such as one day or one week. In another example, the visitor registration slot may expire as a rule, such as "expire when user logs in to another call processing system" or "expire after 10 phone calls."

The processor 33 is operable to update the remote call processing system 30 based on the visitor registration. For example, the processor 33 may notify other phone devices, servers, or communications devices of the visitor registration. Notification may provide the other devices the ability to communicate with the local phone device 22, for example, using an address associated with the visitor registration.

The processor 33 transmits visitor registration information to the local server 21. The visitor registration information may include an address, which may be used for cross-registration. For example, a remote registration address may be provided in the visitor registration information. The local phone device 22 may use the visitor registration information for cross-registration.

The processor 33 may receive a cross-registration request from the local phone device 22. The cross-registration request may be automatically received upon a local phone device 22 reset. The cross-registration request may include local phone device information, which identifies the local phone device 22 being used.

The processor 33 cross-registers the local phone device 22. Upon receiving the cross-registration request, the processor 33 may associate the local phone device 22 with a user having a remote user phone profile 35 stored in the remote call processing system 30. The processor 33 may transmit the corresponding remote user phone profile 35 to the local phone device 22. In the illustration above, once the Chicago Phone, which is being used by John, is reset, the Chicago Phone transmits a cross-registration request to the remote server 31. The NYC Server receives the request and associates the Chicago Phone with John, using the visitor registration. The NYC server transmits John's Phone Profile to the Chicago Phone, so that the Chicago Phone provides John with the ability to use the user preferences stored in the phone profile.

The processor 33 may receive phone calls from the local phone device 22. Once cross-registered, phone calls from the local phone device 22 are routed through the remote server 31. Although the local call processing system 20 is geographically separated from the remote call processing system 30, a phone call placed from the local call processing system 20, which has been cross-registered, has the attributes of phone call placed from the remote call processing system 30. For example, in the illustration above, if John places a call from the Chicago Phone to a system 10 device, then John's directory number (e.g., 35123) may be presented to the system 10 device. However, if John places a call from the Chicago Phone to an external device (e.g., a device outside of the system 10, such as to a customer or vendor), then John's nationalized telephone number (e.g., 212-813-5123) may be presented to the external device. Even though John is in Chicago, where phone numbers have a (312) area code, a NYC area code is presented to the device that John is trying to reach. However, in the event of an emergency, for example, when John dials 911, the emergency officials in Chicago will not have street location for John's nationalized telephone number (e.g., 212-813-5123), which has a NYC area code.

The processor 33 may determine whether the received phone call is a flagged or non-flagged phone call. Determination may include comparing the phone call address to a list of flagged addresses. For example, the phone call address "911" may be a flagged address. Alternatively, or in addition to, a phone call may be flagged based on a geographic location, user information, local phone device information, as a rule, or other flagging process. A flagged phone call may be a phone call with a different route in a route table than non-flagged phone calls or other flagged phone calls.

One benefit of determining phone calls that are flagged is that the system 10 may intelligently route calls. Accordingly, phone calls that need to be routed through a certain geographic PSTN or network, such as emergency calls may be flagged. The flag may be used to determine the route of the phone call.

The processor 33 may route the phone calls based on the flag. For example, emergency calls, such as calls placed to 911, may be routed from the remote server 31 to the local server 21 across network 17, such that the call may be placed using a local gateway 23 connected to a local PSTN 19. In another example, the flag may be used to place person-to-person calls using the remote gateway 32 connected to a remote PSTN or an IP network.

The processor 33 may monitor the bandwidth of the local phone device 22. Monitoring the bandwidth may include comparing the bandwidth needed for a local phone device 22 with the bandwidth available to the remote call processing system 30. The processor 33 may use the results of the comparison to admit or deny admission to the remote call processing system 30. Admission or denial may be based on a rule. For example, if the local phone device 22 requires more bandwidth than is available to the call processing system 30, the processor 33 may deny access to the remote call processing system 30. In another example, the processor 33 may admit or deny admission based on a threshold level, such as a percentage of required bandwidth. The local call processing system 20 may then manage the local phone device 22 with or without the user profile information. Based on the bandwidth, the processor 33 may allow call admission or deny call admission. Call admission may be based on a policy. For example, a very important person "VIP" may receive preference over a non-VIP. Other policies may be used. An agent may use the processor 33 to reserve bandwidth in another call processing system.

The memories 25, 34 are computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memories 25, 34 may be a single device or a combination of devices. The memories 25, 34 may be adjacent to, part of, networked with and/or remote from the processors 24, 33.

The memories 25, 34 may store data representing instructions executable by the programmed processors 24, 33. The processors 24, 33 are programmed with and execute the instructions. The functions, processes, acts, methods or tasks illustrated in the figures or described herein are performed by the programmed processors 24, 33 executing the instructions stored in the memory 25, 34. The functions, acts, processes, methods or tasks are independent of the particular type of instructions set, storage media, processor or processing strategy and may be performed by software, hardware, integrated circuits, firm ware, micro-code and the like, operating alone or in combination.

As shown in FIG. 4, the memory 34 stores a remote user phone profile 35. The remote user phone profile 35 may be the phone profile for the user of the local phone device 22. The phone profile may include phone preferences, such as speed dialing, dialing features, or other features related to a user's phone, such as original phone numbers or original directory numbers.

The memory 34 stores data representing instructions. The instructions may include, as shown in FIG. 4, instructions for cross-registration 310, instructions for routing 320, and instructions for call admission monitoring 330. Additional, different, or fewer instructions may be provided. The instructions are logic to be implemented by a processor. Logic encoded in one or more tangible media for execution is defined as the instructions that are executable by the programmed processor and that are provided on the computer-readable storage media, memories, or a combination thereof.

The instructions for cross-registration 310 may be executed to generate a visitor registration. The visitor registration may be based on information received from the local call processing system 20. The visitor registration may be used to login the local phone device 22 and user of the local phone device 22.

The instructions for cross-registration 310 may be executed to receive a phone call from the local phone device 22.

The instructions for routing 320 may be executed to identify flagged phone calls from the local phone device 22 and route the phone calls based on the flag. For example, the instructions for routing 320 may route flagged phone calls to a local PSTN 19 through a local gateway 23 and local server 21. In another example, the instructions for routing 320 may route non-flagged phone calls to a remote PSTN 18, for example, through a remote server 31 and remote gateway 32.

In yet another example, the routing instructions may be executed to route non-flagged phone calls across an IP network.

The instructions for call admission monitoring 330 may be executed to admit or deny a phone call. The instructions 330 may be executed to compare the bandwidth needed for the phone call to the bandwidth available to the call processing system. Based on the comparison, the call admission monitoring instructions may be executed to admit or deny the phone call. The comparison may be based on a rule.

Figure 5:
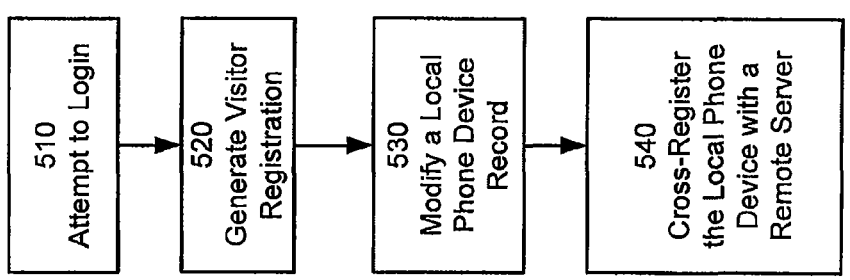
FIG. 5 illustrates one embodiment of a method for cross-registration of a phone device.

FIG. 5 shows a flow chart of a cross-registration method. The method is implemented using the system 10 of FIG. 1 or a different system. The acts may be performed in the order shown or a different order. The acts may be performed automatically, manually, or the combination thereof.

As shown in FIG. 5, the cross-registration method may include attempting to login to a local call processing system; generating a visitor registration in a remote call processing system; modifying a local phone device record; and cross-registering the local phone device with the remote call processing system.

In act 510, a local phone device 622 attempts to login to a local server 621. Attempting to login may include transmitting a "username" and "password" from the local phone device 622 to the local server 621. The local server 621 may receive and process the login attempt. For example, the local server 621 may search for the "username" in a local database of phone profiles and/or may authorize the "password."

Act 510 may include locating a remote server 631 storing a phone profile for the user attempting to login to the local server 621. For example, when the local server 621 is unable to locate the "username" in a local database, the local server 621 may transmit login information to one or more remote servers, such as the remote server 631. The login information may include local phone device 622 information. The login information may be used to locate the remote server 631 storing the user's phone profile. The remote server 631 may confirm that the remote server 631 has the user's phone profile.

Figure 6:
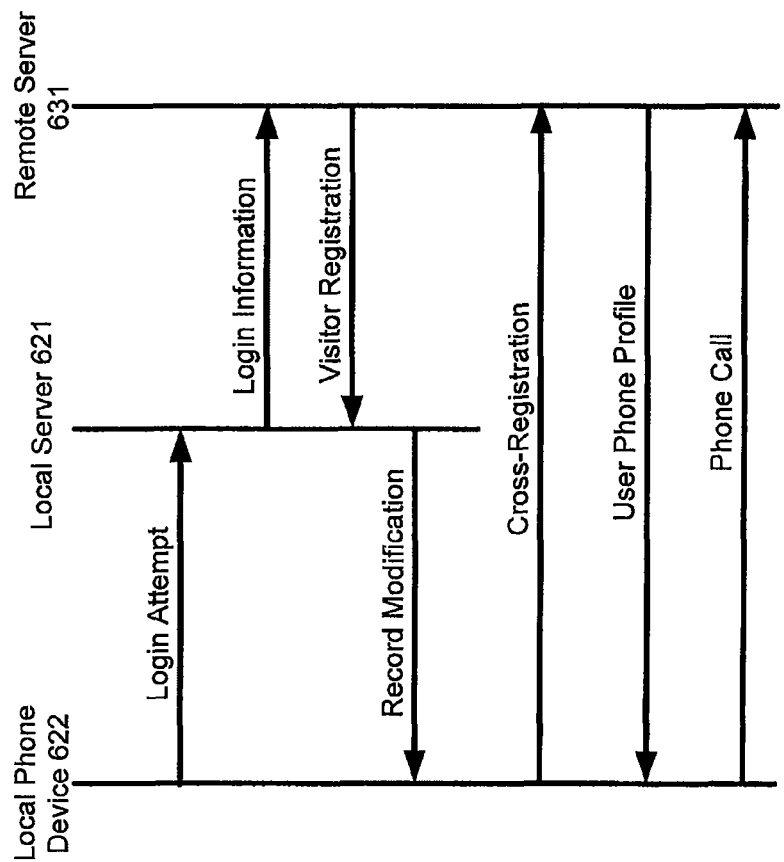
FIG. 6 illustrates one embodiment of cross-registration of a phone device.

In act 520, the remote server 631 generates a visitor registration for the local phone device 622. The visitor registration associates the local phone device 622 user with the local phone device 622. The remote server 631 generates a slot for the local phone device 622, such that when a phone call is received from the local phone device 622, the remote server 631 is operable to identify and accept the phone call. The remote server 631 is operable to update a remote call processing system with visitor registration information, so that other remote call processing system components are operable to communicate with the local phone device 622 or identify the local phone device 622. As shown in FIG. 6, information relating to the visitor registration is transmitted to the local server 621. The visitor registration information may include information relating to a cross-registration address or other cross-registration information. The local phone device 622 may use the cross-registration address to place a phone call.

In act 530, the local server 621 may modify a local phone device record. The record may be modified such that when the local phone device is booted up, the local phone device cross-registers with the remote server 631. Modification may also include rebooting (resetting) the local phone device 622. Rebooting the local phone device 622 may cause the local phone device 622 to receive the modified local phone device 622 record. Upon registration, the local phone device 622 is directed to the remote server 631; not the local server 621. Alternatively, the local phone device 622 is directed to the local server 621, but provided with user profile information retrieved from the remote server 631.

In act 540, the local phone device 622 may cross-register with the remote server 631. Cross-registration may include providing login information to the remote server, obtaining authorization from the remote server, obtaining user's phone profile, and overlaying the phone profile onto the local phone device. For example, as shown in FIG. 6, after the remote server 631 authorizes the user and local phone device, the remote server 631 may transmit the user's phone profile to the local phone device 622. The phone profile may be used to configure the local phone device 622 to provide the user with the set user preferences.

Upon cross-registration, the user may use the local phone device 622 to make a phone call through the remote server 631. As shown in FIG. 6, the phone call is transmitted across a network to the remote server 631. For example, the local phone device 622 may transmit an IP telephony call over an IP network to the remote server 631. The remote server 631 may use a call routing method to route the phone call to the terminating endpoint using the appropriate network.

FIG. 7 shows a flow chart of an emergency call routing method. The method is implemented using the system 10 of FIG. 1 or a different system. The acts may be performed in the order shown or a different order. The acts may be performed automatically, manually, or the combination thereof.

As shown in FIG. 7, the emergency call routing method may include receiving a phone call from a local phone device cross-registered with a remote server; determining whether the phone call is flagged; routing flagged phone calls to a local server; substituting a local phone number for an original phone number; and forwarding the phone call to a local gateway connected to a local PSTN.

In act 710, a remote server 831 receives a phone call from a local phone device 822, which is located in a local call processing system. As illustrated in FIG. 8, the local phone device 822 may be cross-registered with a remote server 831 located in a remote call processing system. The phone call may be an onNet call, an offNet call, or other now known or later developed type of phone call. An onNet call may be transmitted using an IP network. An offNet call may be transmitted using an IP network and/or another network, such as a PSTN.

In act 720, the remote server 831 may determine whether the phone call is flagged. Determining whether a phone call is flagged may include comparing the termination address of the phone call to an emergency database. For example, an emergency call, with a termination address of "911," may be included in a list of flagged phone calls.

In act 730, the remote server 831 may intelligently route the phone call based on whether the phone call was flagged. As shown in FIG. 8, a non-flagged phone call may be routed to a remote gateway 832. The phone call may be routed from the remote gateway 832 to a remote PSTN 18 or other network, such as an IP network.

A flagged phone call may be routed to the local server 821, as shown in FIG. 8. In act 740, the local server 821 may include a local phone number with the flagged phone call. Including a local phone number may include replacing the original phone number with a local phone number that is associated with a geographical location of the local phone device 822, substituting, changing, or altering the original phone number, such that a local phone number is included in the flagged phone call. The local phone number may be used to identify the location of the local phone device 822.

In act 750, the local server 821 may route the flagged phone call, which has the local phone number, to a local gateway 823. The local gateway 823 may route the phone call to the local PSTN 19. The benefit of replacing the original phone number with the local phone number is that emergency officials receiving the phone call from the local PSTN 19 may locate the local phone device's 822 location (e.g., a street address).

Figure 9:
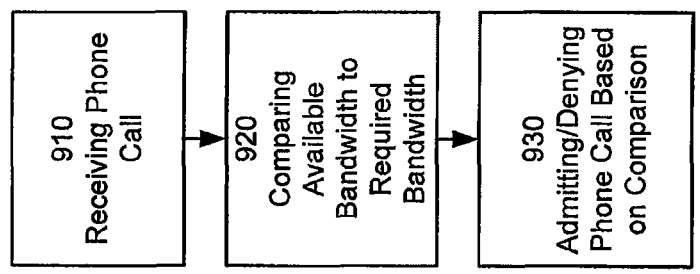
FIG. 9 illustrates one embodiment of a method for call admission with cross-registration.

FIG. 9 shows a flow chart of a call admission method. The method is implemented using the system 10 of FIG. 1 or a different system. The acts may be performed in the order shown or a different order. The acts may be performed automatically, manually, or the combination thereof.

As shown in FIG. 9, the call admission method may include receiving a phone call; comparing the available bandwidth to the required bandwidth; and admitting/denying a phone call based on the comparison. Additional, different, or fewer acts may be provided.

In act 910, a remote call processing system receives a phone call. The phone call may be received from a phone device in a local call processing system. As discussed above, the phone call may be placed from a local phone device that is cross-registered. The remote call processing system may compare the bandwidth available and the bandwidth needed to the place the phone call, as shown in act 920.

Figure 10:
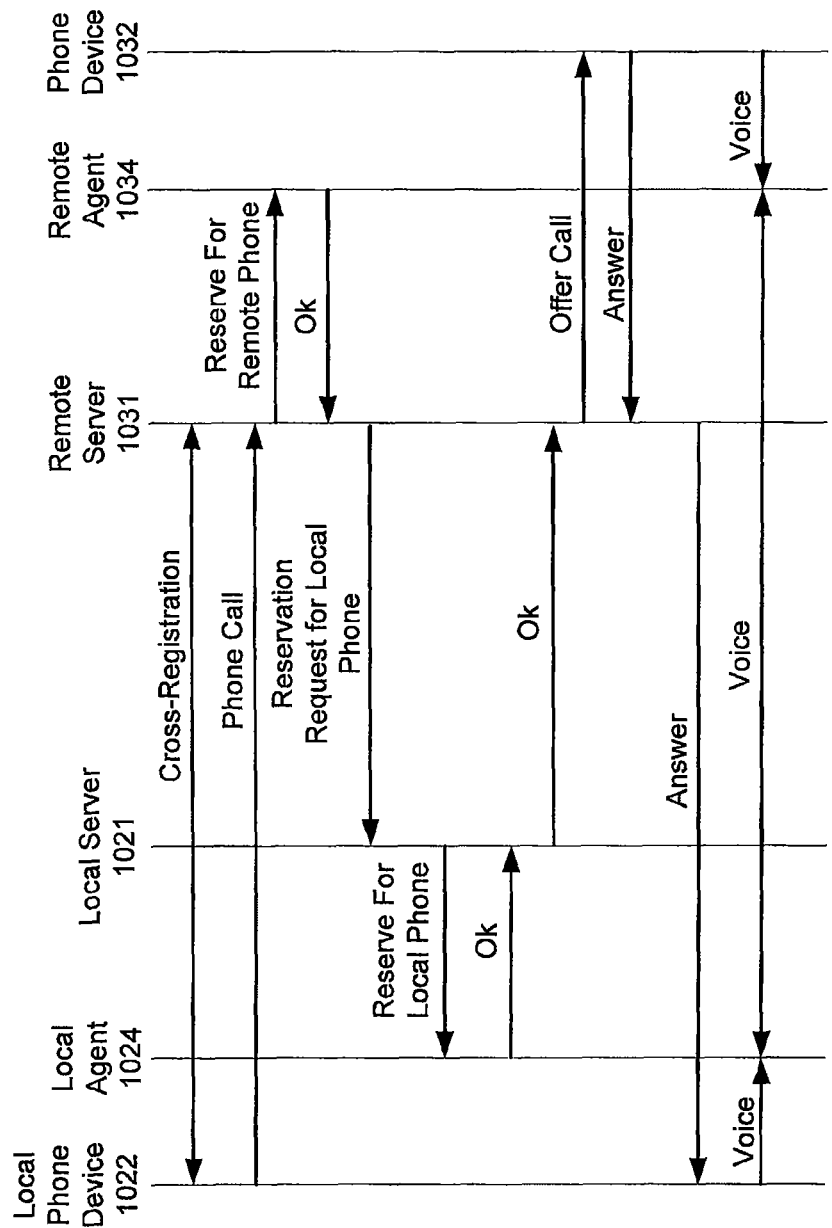
FIG. 10 illustrates one embodiment of call admission monitoring with cross-registration.

Act 910 may include, as shown in FIG. 10, recognizing that the local call processing system does not manage the bandwidth for a cross-registered phone and requesting that the remote call processing system, which does manage the bandwidth for the cross-registered phone manage the bandwidth on the behalf of the local call processing system. As used herein, "monitoring" may include reserving, tracking, accounting, measuring, or other monitoring process. Act 910 may include the acts shown in FIGS. 10 and 11.

In one embodiment, as shown in FIG. 10, call agents may be used for call admission monitoring. Using call agents may require manually performing all, some, or none of the call admission monitoring. Call admission monitoring may include call admission control. As shown in FIG. 10, call admission control may be used to admit or deny call admission, reserving bandwidth for a caller, or a combination thereof. For example, as shown in FIG. 10, after a local phone device 1022 is cross-registered with a remote server 1031, the call admission control is performed to reserve bandwidth for the local phone device 1022. Upon recognizing that the remote server 1031 does not manage the bandwidth for the local phone device 1022, the remote server 1031 transmits a reservation request back to the local server 1021. The reservation request may be used to request that the local server 1021 manage the bandwidth for the local phone device 1022. The local server 1021 reserves the bandwidth for the local phone 1022. Reserving bandwidth for the local phone may include, for example, sending a message to a local agent that reserves the required bandwidth. Other processes are possible. Once the bandwidth is reserved, the phone call is offered to phone device 1032. Once the call is answered and the media is set up, the voice conversation may take place.

Figure 11:
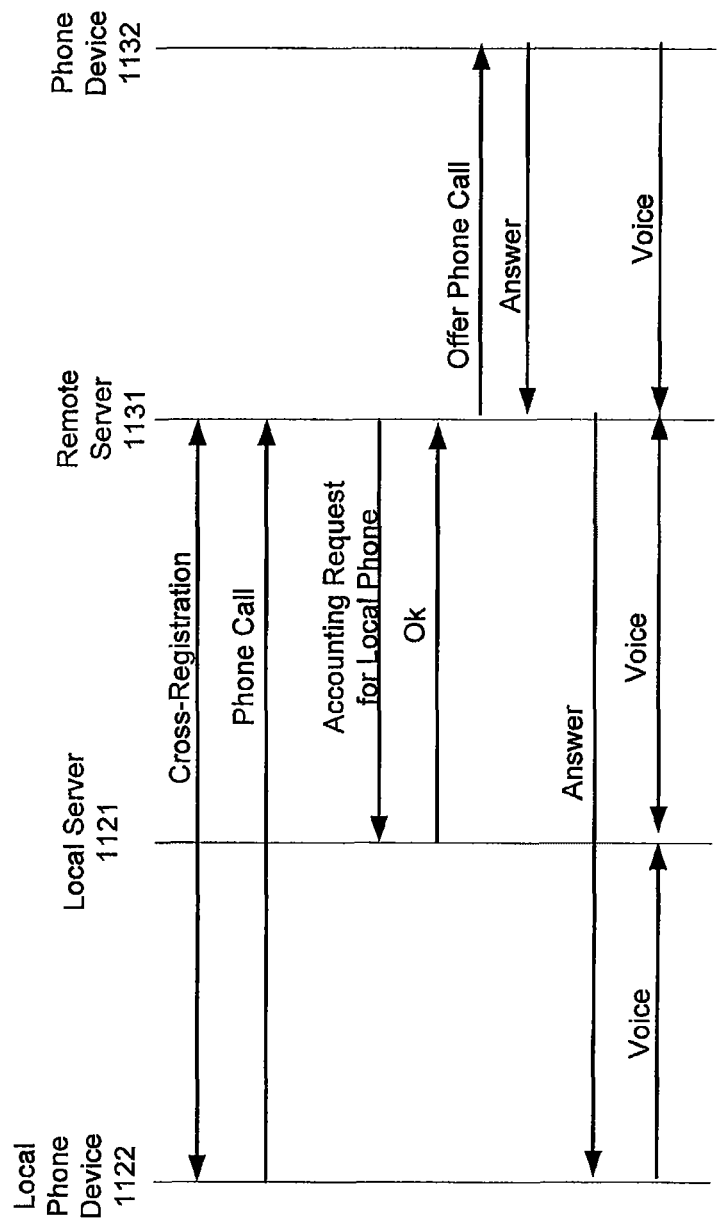
FIG. 11 illustrates another embodiment of call admission monitoring with cross-registration.

In another embodiment, as shown in FIG. 11, the local server 1121 and remote server 1131 may be used for automatic call admission monitoring. In other words, the local call agent 1024 in FIG. 10, may not be needed for call admission control. As shown in FIG. 11, after a local phone device 1122 is cross-registered with a remote server 1131, the remote server 1131 requests that the local server 1121 accounts for (e.g., track, count, monitor) the bandwidth used by the local phone device 1122, since the remote server 1131 does not manage the bandwidth for the local phone device 1022. Once the local server 1121 confirms that it will account for the bandwidth used by the local phone device 1122, the phone call may be offered to the phone device 1132. Once the call is answered and the media is set up, the voice conversation may take place.

One benefit of having the local server 1121 account for the bandwidth used by the local phone device 1122 is that the local server 1121 may allow the local phone device 1122 to use a designated amount of bandwidth, for example, below a predetermined threshold. Accordingly, the local phone device 1122 does not use more bandwidth than is available. The predetermined threshold may be provided by the remote server 1131 in the request for accounting. Another benefit of bandwidth accounting is the ability to increase control of the communications (e.g., traffic, packets) on a network link, so as to avoid filling a link to capacity or overfilling the link, which would result in network congestion and poor performance.

In act 930, the remote call processing system may admit or deny admission to the remote call processing system based on the comparison. One benefit of comparing the bandwidth available to the remote call processing system and the bandwidth needed to the place the phone call is that the remote call processing system may monitor the calls being admitted or denied to provide optimum service. The remote call processing system may deny phone calls that are going to use all or some of the bandwidth available.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A device comprising:
a memory comprising:
cross-registration instructions that are executable to cross-register a phone device located in a first call processing system with a second call processing system, the first call processing system comprising phone device information and the second call processing system comprising a user phone profile, wherein the cross-registration instructions are executable to generate a visitor registration in the second call processing system for the phone device and the visitor registration is used to login the phone device into the second call processing system;
configuration instructions that are executable to initiate installation of the user phone profile from the second call processing system onto the phone device located in the first call processing system; and
receive instructions that are executable to receive a phone call from the phone device; and
a processor that is operable to execute the cross-registration instructions, the configuration instructions and the receive instructions.

2. The device as claimed in claim 1, the memory comprising: routing instructions that are executable to route a flagged phone call to the first call processing system, such that the first call processing system routes the flagged phone call to a first telephone network.

3. The device as claimed in claim 2, wherein the routing instructions are executable to compare a phone call address to a list of flagged phone call addresses to determine whether the phone call is flagged.

4. The device as claimed in claim 1, wherein the memory comprises: call admission instructions that are executable to admit or deny the reception of the phone call to the second call processing system based on a bandwidth of the phone call compared to bandwidth available to the second call processing system.

5. The device of claim 1, wherein the cross-registration instructions are configured to insert a local phone number in the local phone profile.

6. The device of claim 5, wherein the local phone number is geographically associated with the first call processing system.

7. The device of claim 5, wherein the cross-registration instructions are configured to remove a remote phone number from the local phone profile, wherein the remote phone number is geographically associated with the second call processing system.

8. A method comprising:
receiving phone device information for a phone device located in a first call processing system, which does not include a user phone profile for a user of the phone device;
determining whether a phone call made by the phone device is a flagged phone call;
routing the phone call to the first call processing system when the phone call is flagged and to a second call processing system when the phone call is not flagged;
generating a visitor registration for the phone device based on the phone device information;
registering the phone device using the visitor registration; and
transferring the user phone profile for the user from the second call processing system for receipt by the phone device located in the first call processing system.

9. The method as claimed in claim 8, wherein the flagged phone call is an emergency phone call.

10. The method as claimed in claim 8, further comprising: determining a bandwidth requirement of the phone call.

11. The method as claimed in claim 8, further comprising: denying the phone call when a bandwidth requirement is above a threshold.

12. A network device, comprising:
a memory configured to store a plurality of local phone profiles;
a processor configured to search the plurality of local phone profiles for a local phone device of a user, the processor further configured to generate a first registration in response to the local phone device matching one of the plurality of local phone profiles and to receive a second registration from a remote call processing system if the local phone device does not match any of the plurality of local phone profiles,
wherein the processor is configured to use the second registration to login to the remote call processing system.

13. The network device of claim 12, wherein one of the plurality of local phone profiles includes a user phone feature set by the user.

14. The network device of claim 12, wherein the local phone device sends a phone call to the remote call processing system.

15. The network device of claim 12, wherein an emergency phone call is routed to the local call processing system for transmission across a local network.

16. The network device of claim 12, wherein the processor is further configured to replace an original phone number associated with an emergency phone call with a local phone number associated with a geographical location of the local phone device.

17. The network device of claim 12, wherein the processor is further configured to control call admission according to a comparison of a bandwidth available to the remote call processing system to a bandwidth needed for a phone call.

18. The network device of claim 12, wherein the processor is configured to replace a phone number for the local phone device with a replacement phone number registered with the network device.

19. The network device of claim 12, wherein the processor is configured to transfer the matching local phone profile for receipt by the corresponding phone device.

\* \* \* \* \*